US012600897B2

(12) United States Patent

Somerville et al.

(10) Patent No.: US 12,600,897 B2

(45) Date of Patent: Apr. 14, 2026

(54) LIGNIN-BASED DILUENT AND RELATED METHODS

(71) Applicant: LignoSol IP Limited, San Gwann (MT)

(72) Inventors: Desmond Alexander Somerville, San Gwann (MT); Patrick Dieter Waibel, San Gwann (MT)

(73) Assignee: LignoSol IP Limited, San Gwann (MT)

( * ) Notice: Subject to any disclaimer, the term of this patent is extended or adjusted under 35 U.S.C. 154(b) by 194 days.

(21) Appl. No.: 18/285,711

(22) PCT Filed: Apr. 5, 2022

(86) PCT No.: PCT/IB2022/053158

§ 371 (c)(1),
(2) Date: Oct. 5, 2023

(87) PCT Pub. No.: WO2022/214958

PCT Pub. Date: Oct. 13, 2022

(65) Prior Publication Data

US 2024/0182777 A1 Jun. 6, 2024

(30) Foreign Application Priority Data

Apr. 6, 2021 (GB) ..................................... 2104870
Nov. 8, 2021 (GB) ..................................... 2115987

(51) Int. Cl.

| | |
|---|---|
| *C09K 8/582* | (2006.01) |
| *C09K 8/584* | (2006.01) |
| *C09K 8/594* | (2006.01) |
| *C10G 71/00* | (2006.01) |

(52) U.S. Cl.

CPC .............. *C09K 8/582* (2013.01); *C09K 8/584* (2013.01); *C09K 8/594* (2013.01); *C10G 71/00* (2013.01); *C09K 2208/10* (2013.01)

(58) Field of Classification Search

CPC ......... C09K 8/582; C09K 8/584; C09K 8/594
See application file for complete search history.

(56) References Cited

U.S. PATENT DOCUMENTS

| | | | |
|---|---|---|---|
| 3,438,895 | A | 4/1969 | Edmonsond et al. |
| 3,864,276 | A | 2/1975 | Benko et al. |
| 4,101,394 | A | 7/1978 | Johnson |
| 4,133,385 | A | 1/1979 | Kalfoglou |
| 4,304,572 | A | 12/1981 | Wiese et al. |
| 4,392,941 | A | 7/1983 | Roth et al. |
| 4,877,517 | A | 10/1989 | Bulatovic et al. |
| 5,028,238 | A | 7/1991 | von Rybinski et al. |
| 5,059,332 | A | 10/1991 | Satoh |
| 5,114,597 | A | 5/1992 | Rayborn et al. |
| 5,164,480 | A | 11/1992 | Huibers et al. |
| 5,246,602 | A | 9/1993 | Forrest |
| 5,248,329 | A | 9/1993 | Rusin et al. |
| 5,316,664 | A | 5/1994 | Gregoli et al. |
| 5,316,682 | A | 5/1994 | Keyser et al. |
| 5,344,625 | A | 9/1994 | Clough |
| 5,368,972 | A | 11/1994 | Yamashita et al. |
| 5,711,383 | A | 1/1998 | Terry et al. |
| 5,743,945 | A | 4/1998 | Yamashita et al. |
| 5,911,276 | A | 6/1999 | Kieke |
| 6,306,800 | B1 | 10/2001 | Samuel et al. |
| 6,348,436 | B1 | 2/2002 | Langlois et al. |
| 8,450,260 | B2 | 5/2013 | Crawford et al. |
| 8,455,226 | B2 | 6/2013 | De Windt et al. |
| 8,748,153 | B2 | 6/2014 | Tadic et al. |
| 10,362,786 | B2 | 7/2019 | Chen et al. |
| 10,829,833 | B2 | 11/2020 | Gos et al. |
| 12,275,894 | B2 | 4/2025 | Somerville et al. |
| 2002/0044887 | A1 | 4/2002 | Jones |
| 2006/0177661 | A1 | 8/2006 | Smith et al. |
| 2007/0045198 | A1 | 3/2007 | Sugiura |
| 2009/0011972 | A1 | 1/2009 | Suzuki et al. |
| 2009/0082227 | A1 | 3/2009 | Hnatow et al. |
| 2009/0211960 | A1 | 8/2009 | Nilsen et al. |
| 2009/0266541 | A1 | 10/2009 | Reynolds et al. |
| 2009/0291861 | A1 | 11/2009 | Sawdon |
| 2010/0137168 | A1 | 6/2010 | Quintero et al. |
| 2010/0233050 | A1 | 9/2010 | Gargulak et al. |
| 2012/0247763 | A1 | 10/2012 | Rakitsky et al. |
| 2013/0274150 | A1 | 10/2013 | Holt et al. |
| 2014/0261077 | A1 | 9/2014 | Merck et al. |

(Continued)

FOREIGN PATENT DOCUMENTS

| | | |
|---|---|---|
| CA | 1132452 A | 9/1982 |
| CA | 2425424 A1 | 4/2002 |

(Continued)

OTHER PUBLICATIONS

Beisl et al., "Lignin from Micro- to Nanosize: Production Methods." Int. Journal of Molecular Sciences. 18(6): 1244 (Jun. 10, 2017) (31 pages).

Bicca et al., "Production of Biosurfactant by Hydrocarbon Degrading Rhodococcus Ruber and Rhodococcus Erythropolis." Revista de Microbiologia. 30: 231-236 (1999) (6 pages).

Chang et al., "A novel nano-lignin-based amphoteric copolymer as fluid-loss reducer in water-based drilling fluids." Colloids and Surfaces A. 583:123979 (Sep. 21, 2019) (10 pages).

Hruzová et al., "Organosolv lignin hydrophobic micro- and nanoparticles as a low-carbon footprint biodegradable flotation collector in mineral flotation." Bioresource Technology. 306:123235 (Mar. 23, 2020) (4 pages).

(Continued)

*Primary Examiner* — Randy Boyer

(74) *Attorney, Agent, or Firm* — Clark & Elbing LLP

(57) ABSTRACT

Diluents are provided for heavy oil treatment applications, in particular for treating bitumen. In some embodiments, the diluents comprise lignin, in particular technical lignin, and at least one strain of bacteria capable of biosurfactant production and/or a biosurfactant produced by at least one such isolated strain of bacteria.

20 Claims, 1 Drawing Sheet

(56)                    References Cited

U.S. PATENT DOCUMENTS

| | | |
|---|---|---|
| 2014/0371071 A1 | 12/2014 | Nitsche |
| 2015/0166836 A1 | 6/2015 | Liu et al. |
| 2015/0285051 A1 | 10/2015 | Miller et al. |
| 2016/0168272 A1 | 6/2016 | Retsina et al. |
| 2016/0236158 A1 | 8/2016 | Bauer |
| 2017/0029691 A1 | 2/2017 | Faust, Jr. et al. |
| 2017/0306264 A1 | 10/2017 | Peggau et al. |
| 2018/0148632 A1 | 5/2018 | Bennett et al. |
| 2018/0265794 A1 | 9/2018 | Dahlstrand et al. |
| 2018/0355446 A1* | 12/2018 | Medoff ................... B01D 61/58 |
| 2019/0031945 A1 | 1/2019 | Guo et al. |
| 2019/0055459 A1 | 2/2019 | Zelenev et al. |
| 2019/0093463 A1 | 3/2019 | Hardin et al. |
| 2019/0184350 A1 | 6/2019 | Terasaka et al. |
| 2019/0382649 A1 | 12/2019 | Jiang et al. |
| 2019/0390405 A1 | 12/2019 | Geigle et al. |
| 2020/0032128 A1* | 1/2020 | Farmer .................... C12N 1/16 |
| 2020/0157408 A1* | 5/2020 | Farmer .................. C09K 8/582 |
| 2020/0172788 A1 | 6/2020 | Farmer et al. |
| 2020/0255466 A1* | 8/2020 | Lintinen .............. B01J 13/0021 |
| 2020/0352016 A1 | 11/2020 | Bohdy |
| 2021/0261451 A1 | 8/2021 | Patton |
| 2021/0261459 A1 | 8/2021 | Alibek et al. |

FOREIGN PATENT DOCUMENTS

| | | |
|---|---|---|
| CA | 2535702 A1 | 3/2005 |
| CA | 2547100 A1 | 11/2006 |
| CA | 2640005 A1 | 8/2007 |
| CA | 2661202 C | 11/2011 |
| CA | 2723591 C | 7/2013 |
| CA | 2705147 C | 9/2014 |
| CA | 2921996 A1 | 3/2015 |
| CA | 2693008 C | 4/2016 |
| CA | 2988826 A1 | 12/2016 |
| CA | 2791256 C | 6/2017 |
| CA | 3048404 A1 | 7/2018 |
| CA | 3052048 A1 | 8/2018 |
| CA | 3052465 A1 | 8/2018 |
| CA | 3054686 A1 | 9/2018 |
| CA | 3058761 A1 | 10/2018 |
| CA | 2999599 C | 12/2019 |
| CA | 2772395 C | 1/2020 |
| CA | 2720739 C | 4/2020 |
| CA | 2950089 C | 4/2020 |
| CA | 2831902 C | 5/2020 |
| CA | 2877367 C | 12/2020 |
| CA | 2945194 C | 7/2022 |
| CA | 2886934 C | 1/2023 |
| CN | 85105225 A | 7/1986 |
| CN | 101104177 A | 1/2008 |
| CN | 104152129 A | 11/2014 |
| CN | 104321422 A | 1/2015 |
| CN | 103636599 B | 3/2015 |
| CN | 205527917 U | 8/2016 |
| CN | 106188857 A | 12/2016 |
| CN | 108441223 A | 8/2018 |
| CN | 106217826 B | 9/2018 |
| CN | 108623112 A | 10/2018 |
| CN | 109943299 A | 6/2019 |
| CN | 110616062 A | 12/2019 |
| GB | 2514202 A | 11/2014 |
| GB | 2605591 A | 10/2022 |
| JP | 2011-121002 A | 6/2011 |
| JP | 2017029892 A | 2/2017 |
| KR | 101711607 B1 | 3/2017 |
| KR | 10-2018-0130070 A | 12/2018 |
| RU | 2188935 C1 | 9/2002 |
| WO | WO-1992/19349 A1 | 11/1992 |
| WO | WO-2005/028592 A1 | 3/2005 |
| WO | WO-2012/151524 A2 | 11/2012 |
| WO | WO-2013/037643 A1 | 3/2013 |
| WO | WO-2015/065981 A1 | 5/2015 |
| WO | WO-2016/053345 A1 | 4/2016 |
| WO | WO-2016/196680 A1 | 12/2016 |
| WO | WO-2018/064689 A1 | 4/2018 |
| WO | WO-2019/067356 A1 | 4/2019 |
| WO | WO-2019/112970 A1 | 6/2019 |
| WO | WO-2019/191296 A1 | 10/2019 |
| WO | WO-2019/213055 A1 | 11/2019 |
| WO | WO-2020/028253 A1 | 2/2020 |
| WO | WO-2020/060529 A1 | 3/2020 |
| WO | WO-2020/072735 A1 | 4/2020 |
| WO | WO-2020/149756 A2 | 7/2020 |
| WO | WO-2020/264073 A1 | 12/2020 |
| WO | WO-2021/015633 A1 | 1/2021 |
| WO | WO-2021/052939 A1 | 3/2021 |

OTHER PUBLICATIONS

International Search Report and Written Opinion for International Application No. PCT/IB22/53145 mailed Jun. 27, 2022 (9 pages).

International Search Report and Written Opinion for International Application No. PCT/IB22/53147 mailed Jun. 15, 2022 (9 pages).

International Search Report and Written Opinion for International Application No. PCT/IB22/53148 mailed Jun. 27, 2022 (9 pages).

International Search Report and Written Opinion for International Application No. PCT/IB22/53151 mailed Jun. 29, 2022 (9 pages).

International Search Report and Written Opinion for International Application No. PCT/IB22/53158 mailed Jun. 21, 2022 (8 pages).

International Search Report and Written Opinion for International Application No. PCT/IB22/53160 mailed Jun. 29, 2022 (7 pages).

International Search Report and Written Opinion for International Application No. PCT/IB22/53161 mailed Jun. 27, 2022 (6 pages).

International Search Report and Written Opinion for International Application No. PCT/IB22/53162 mailed Jul. 1, 2022 (7 pages).

Li, Qingxin, "Rhamnolipid synthesis and production with diverse resources." Front. Chem. Sci. Eng. 11(1): 27-36 (Mar. 22, 2017) (10 pages).

Negi et al., "A review on lignin utilization in petroleum exploration, petroleum products formulation, bio-fuel production, and oil spill clean-up." Biomass Conversion and Biorefinery. 13: 1417-1428 (Nov. 5, 2020) (12 pages).

Sauki et al., "Extracted Lignin from Rhizophora's Black Liquor as Fluid Loss Control Additive in Water Based Drilling Mud." Key Engineering Materials. 755: 74-80 (Aug. 20, 2018) (8 pages).

Schneider et al., "Assessment of Morphological, Physical, Thermal, and Thermal Conductivity Properties of Polypropylene/ Lignosulfonate Blends." Materials. 14(3): 543 (Jan. 23, 2021) (10 pages).

Search and Examination Report for Application No. GB2104859.0, dated May 11, 2021 (8 pages).

Search and Examination Report for Application No. GB2104860.8, dated May 4, 2021 (8 pages).

Search and Examination Report for Application No. GB2104862.4, dated May 21, 2021 (8 pages).

Search and Examination Report for Application No. GB2104865.7, dated Jun. 8, 2021 (8 pages).

Search and Examination Report for Application No. GB2104869.9, dated Apr. 16, 2021 (6 pages).

Search and Examination Report for Application No. GB2104870.7, dated Jun. 2, 2021 (7 pages).

Search and Examination Report for Application No. GB2104877.2, dated May 10, 2021 (6 pages).

Search and Examination Report for Application No. GB2104883.0, dated May 4, 2021 (8 pages).

Search and Examination Report for Application No. GB2115987.6, dated Dec. 15, 2021 (6 pages).

Solihat et al., "Lignin as an Active Biomaterial: A Review." Jurnal Sylva Lestari. 9(1): 1-22 (Jan. 2021) (22 pages).

EP Application No. EP4320192, Extended European Search Report (EESR), Search Opinion, and Supplementary Search Report, dated Jan. 17, 2025 (11 pages).

GB Application No. GB2116007.2, Search and Examination Report, dated Nov. 25, 2021 (8 pages).

GB Application No. GB2214123.8, Search and Examination Report, dated Nov. 18, 2022 (8 pages).

(56) References Cited

OTHER PUBLICATIONS

Madhu, "Difference Between Anolyte and Catholyte", published Online Sep. 19, 2020 at: https://www.differencebetween.com/difference-between-anolyte-and-catholyte/ (3 pages).

Nazari et al., "Study relationships between flotation variables and recovery of coarse particles in the absence and presence of nanobubble," Colloids and Surfaces A: Physicochemical and Engineering Aspects 559:284-8 (Sep. 27, 2018).

PCT Application No. PCT/IB22/59176, International Search Report (ISR) and Written Opinion, mailed Jan. 26, 2023 (9 pages).

PCT Application No. PCT/IB23/59500, International Search Report (ISR) and Written Opinion, mailed Feb. 2, 2024 (8 pages).

Schneider et al., "Assessment of Morphological, Physical, Thermal, and Thermal Conductivity Properties of Polypropylene/Lignosulfonate Blends", Materials, (Jan. 2021) vol. 14; 543 (10 pages).

This vs. That: Anolyte vs. Catholyte, published Online at: https://thisvsthat.io/anolyte-vs-catholyte (2023) (2 pages).

* cited by examiner

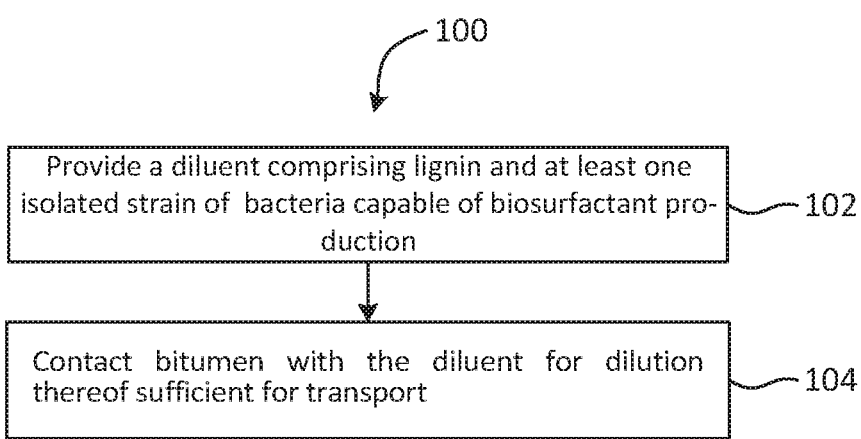

LIGNIN-BASED DILUENT AND RELATED METHODS

CROSS-REFERENCE TO RELATED APPLICATIONS

This application claims priority to GB Provisional Patent Application No. 2104870.7, filed 6 Apr. 2021, and GB Provisional Patent Application No. 2115987.6, filed 8 Nov. 2021, the disclosures of which are hereby incorporated by reference in their entireties.

BACKGROUND OF THE INVENTION

This invention relates to the dilution of heavy oils, in particular bitumen, to render them suitable for transport. More particularly, the present invention relates to lignin-based diluents for bitumen treatment and related methods.

Oil sands, also referred to as tar sands, are a type of unconventional petroleum deposit found in countries such as Canada, Venezuela, Kazahkstan, and Russia. These deposits are typically a complex mixture of particulate matter such as sand, quartz crystal or clay, with heavy oil, extra heavy oil and/or bitumen, and water.

Various techniques exist for extracting oil from oil sands, such as cold heavy oil production with sand (CHOPS), cyclic steam stimulation (CSS), steam assisted gravity drainage (SAGD), vapour extraction (VAPEX), toe to heel air injection (THAI), combustion overhead gravity drainage (COGD), or a combination of these techniques. Some oil sands deposits that are located close to the surface may also be extracted using surface mining techniques, typically followed by a hot or warm water separation process.

Whichever technique is used to extract the heavy oils, they are too viscous and dense to transport to refineries using traditional pipelines or rail transport. One option is to upgrade the bitumen into a lighter fraction by fractionation and chemical treatment. Upgrading of bitumen is not always cost effective due to high capital costs and strong demand for heavy crude, often exacerbated by the oil sands being located remote areas. Typically about a third of heavy oils from oil sands is upgraded to a lighter synthetic crude oil fraction.

The alternative, more prevalent method is to blend the crude oil with a diluent, which is typically a lighter hydrocarbon liquid or natural gas-condensate, for example naphtha. Due to insufficient quantities of natural gas condensate in the general surrounding area of the oil sands deposits, these generally need to be piped in, often at considerable cost. For example, Alberta in which the Athabasca oils sands is located has insufficient quantities of natural gas condensate, resulting in large quantities of the diluent being imported from the U.S.

Moreover, pipeline leaks present a significant environmental problem, particularly as the as traditional diluents may include hazardous chemicals such as benzene, toluene and hexane, for example. By way of a further example, hot water extraction of surface-mined oil sands produces large volumes of oil sands tailings which typically comprise a mixture of water, sand, clay, and residual bitumen. Pipeline leaks may produce mixtures of oil and soil or sand, often also with water. Separation of the hydrocarbons from the ground material and/or water may be difficult and expensive.

There is thus a growing need for diluents in general, and more cost effective and environmentally friendly diluents in particular. The present invention provides diluents that address these concerns.

SUMMARY OF THE INVENTION

In one aspect of the invention, a method of diluting a heavy oil material, in particular bitumen, comprises:

providing a diluent comprising lignin and at least one isolated strain of bacteria capable of producing at least one biosurfactant, and/or at least one biosurfactant produced from at least one bacteria capable of producing a biosurfactant, the diluent comprising from about 1 wt. % to about 65 wt. % of concentrated lignin, the amount of diluent in the diluted material being from about 5 wt. % to about 60 wt. %, more preferably from about 10 wt. % to about 35 wt. %; and contacting the heavy oil containing material with the diluent in an amount of diluent sufficient for the diluted material to be transported by pipeline or rail.

In another aspect of the invention, there is provided a diluent suitable for diluting a heavy oil containing material, in particular bitumen, the diluent comprising lignin and in some embodiments at least one isolated strain of bacteria capable of producing at least one biosurfactant, and/or at least one biosurfactant produced from at least one isolated strain of bacteria capable of producing a biosurfactant, the diluent comprising from about 1 wt. % to about 65 wt. % of concentrated lignin, the amount of diluent in the diluted material being from about 5 wt. % to about 60 wt. %, more preferably from about 10 wt. % to about 35 wt. %.

In some embodiments, the lignin is technical lignin.

In some embodiments, the technical lignin comprises at least one of Kraft lignin, lignosulfonates, soda lignin, organosolv lignins, steam-explosion lignin, enzymatic hydrolysis lignin, or unhydrolyzed Kraft black liquor lignin.

In some embodiments, the lignin is in an aqueous suspension.

In some embodiments, the lignin comprises at least one of lignin nanoparticles and lignin microparticles.

In some embodiments, the at least one isolated strain comprises at least one isolated strain of *Bacillus*.

In some embodiments, the diluent comprises a catholyte solution, in particular a stabilized or enhanced catholyte solution.

In some embodiments, the diluent further comprises at least one of a carboxylic acid or a salt or ester thereof.

In some embodiments, the carboxylic acid ester comprises a methyl ester or a butyl ester.

In some embodiments, the carboxylic acid or salt or ester thereof comprises a di-carboxylic acid or a salt or ester thereof.

In some embodiments, the diluent further comprises carbon black.

In some embodiments, the diluent is gasified.

In some embodiments, the diluent is gasified with at least one of nanobubbles and microbubbles.

The invention extends to the use of technical lignin as a diluent for treating bitumen to render it suitable for transport, particularly by pipeline or rail.

Other aspects and features of the present invention will become apparent, to those ordinarily skilled in the art, upon review of the following description of specific embodiments of the disclosure.

BRIEF DESCRIPTION OF THE DRAWINGS

The invention will now be described in more detail, by way of example only, with reference to the accompanying drawing(s) in which:

FIG. 1 is a flowchart of an example method for diluting bitumen, according to some embodiments.

DESCRIPTION OF PREFERRED EMBODIMENTS

The diluents of the invention, in particular lignin-based diluents, are provided for treating heavy oil continuing materials and related methods. For convenience, the heavy oil containing materials are referred to as bitumen in what follows. However, it is to be understood that the diluents of the invention may be used in treating any heavy oil containing materials that are not suitable for transport using traditional transport means due to being too viscous and/or too dense. In some embodiments, the diluent comprises lignin and at least one biosurfactant, in particular produced by at least one strain of bacteria capable of biosurfactant production. Also provided is a method for treating or diluting bitumen and related materials to render them suitable for transport.

As used herein, "lignin" refers to a biopolymer that is found in the secondary cell wall of plants and some algae. Lignin is a complex cross-linked phenolic polymer with high heterogeneity. Typical sources for the lignin include, but are not limited to, softwood, hardwood, and herbaceous plants such as corn stover, bagasse, grass, and straw, for example.

In some embodiments, the lignin comprises technical lignin. As used herein, "technical lignin" refers to lignin that has been isolated from lignocellulosic biomass, for example, as a byproduct of a pulp and paper production or a lignocellulosic biorefinery. Technical lignins may have a modified structure compared to native lignin and may contain impurities depending on the extraction process. In some embodiments, the technical lignin comprises at least one of Kraft lignin, lignosulfonates, soda lignin, organosolv lignin, steam-explosion lignin, and enzymatic hydrolysis lignin. In other embodiments, the technical lignin may comprise any other form of technical lignin.

In embodiments where the lignin comprises lignosulfonates, the lignosulfonates may be in the form of a salt including, for example, sodium lignosulfonate, calcium lignosulfonate, or ammonium lignosulfonate.

In other embodiments, the technical lignin is in the form of unhydrolyzed Kraft black liquor. Black liquor is a byproduct of the Kraft process and may contain not only lignin but hemicellulose, inorganic chemicals used in the pulping process, and other impurities. In other embodiments, the technical lignin is in the form of "brown liquor" (also referred to as red liquor, thick liquor or sulfite liquor), which refers to the spent liquor of the sulfite process. In other embodiments, the technical lignin may be in the form of any other spent cooking liquor of a pulping process or any other suitable lignin-based byproduct.

In other embodiments, the lignin may be synthetic lignin or any other suitable type of lignin.

In some embodiments, the lignin is hydrolyzed. As used herein, "hydrolyze" refers to using acid or base hydrolysis at least partially to separate lignin from the polysaccharide content of the lignocellulosic biomass. For example, where the lignin is in the form of black liquor, carbon dioxide may be used to precipitate Kraft lignin from the black liquor and then the Kraft lignin may be neutralized with sodium hydroxide.

In some embodiments, the lignin is in an aqueous suspension. As used herein, an "aqueous suspension" of lignin refers to solid particles of lignin suspended, dispersed, and/or dissolved in a solvent that at least partially comprises water. In some embodiments, the solvent comprises substantially all water.

In some embodiments, the diluent comprises from about 1 wt. % to about 65 wt. % of concentrated lignin, the amount of diluent in the diluted material being from about 5 wt. % or about 10 wt. % to about 35 wt. % or about 50 wt. % or about 60 wt. %.

In some embodiments, the aqueous suspension of lignin may have a solids content of about 10% to about 90%, or about 25% to about 75%, or about 30% to about 60%, or about 33% to about 55%. In some embodiments, the aqueous suspension of lignin may have a solids content of about 10% or above, or of about 25% or above, or of about 30% or above, or of about 33% or above. In some embodiments, the aqueous suspension of lignin may have a solids content of about 90% or below, or of about 75% or below, or of about 60% or below, or of about 55% or below. In some embodiments, the aqueous suspension has a solids content of about 46%. A solids content of about 33% to about 55% may allow the composition to be flowable, which may be preferred for some applications. In other applications, the composition may be used as a slurry and the solids content may be as high as about 85% to about 90%.

In some embodiments, the lignin comprises at least one of lignin nanoparticles and lignin microparticles. As used herein, "nanoparticle" refers to a particle in the nanometer size range, for example, between about 1 nm and about 100 nm, and "microparticle" refers to a particle in the micrometer size range, for example, between about 100 nm and about 1000 $\mu$m (1 mm). In some preferred embodiments, the lignin particles have a size of about 200 nm or less, or about 100 nm or less. In some preferred embodiments, at least about 20%, or at least 30%, or at least 40%, or at least 50%, or at least 60%, or at least 70%, or at least 80%, or at least 90% of the lignin particles are nanoparticles having a size of about 100 nm or less.

The lignin nanoparticles and/or microparticles can be produced by any suitable method. For example, the lignin nanoparticles and/or microparticles can be produced using at least one of: solvent shifting; pH shifting; cross-linking polymerization; mechanical treatment; ice-segregation; template based synthesis; aerosol processing; electro spinning; and carbon dioxide ($CO_2$) antisolvent treatment. Such methods are described in Beisl et al. "Lignin from Micro- to Nanosize: Production Methods" Int. J. Mol. Sci. 2017; 18: 1244, incorporated herein by reference in its entirety.

In some preferred embodiments, lignin nanoparticles are produced using a pH shifting method, for example, as disclosed in Beisl et al. Briefly, the starting lignin material may be dissolved in a basic solution (e.g. an aqueous NaOH solution at pH 12) and the pH of the solution may be gradually decreased by addition of acid (e.g. $HNO_3$) to precipitate lignin nanoparticles. The solution may then be neutralized (e.g. by addition of NaOH) to re-suspend the nanoparticles. The resulting particles may have a size of about 200 nm or less, or about 100 nm or less. In other embodiments, the lignin nanoparticles may be produced by any other suitable method.

By providing the lignin in the form of lignin nanoparticles and/or microparticles, the surface area of the lignin is increased, thereby also increasing the negative force around each particle. In addition, lignin nanoparticles and/or microparticles may have improved solubility in water. Conventional lignins are typically only soluble in water at alkaline pH; however, nanoparticles and/or microparticles may be soluble in approximately neutral water (Beisl et al.), which may be preferred for some applications.

In some embodiments, where the lignin comprises an aqueous suspension of lignin nanoparticles, the zeta potential value of the suspension may be about −5 to about −80 mV. In some embodiments, the specific gravity of the aqueous suspension of lignin nanoparticles is between about 1.286 to about 1.7 SG.

The diluent further comprises at least one isolated strain of bacteria capable of biosurfactant production. As used herein, "isolated" or "isolate", when used in reference to a strain of bacteria, refers to bacteria that have been separated from their natural environment. In some embodiments, the isolated strain or isolate is a biologically pure culture of a specific strain of bacteria. As used herein, "biologically pure" refers to a culture that is substantially free of other organisms.

As used herein, "biosurfactant" refers to compounds that are produced at the bacterial cell surface and/or secreted from the bacterial cell and function to reduce surface tension and/or interfacial tension. Non-limiting examples of biosurfactants include lipopeptides, surfactin, glycolipids, rhamnolipids, methyl rhamnolipids, and viscosin, for example. The isolated strain may be capable of producing one or more types of biosurfactant.

In some embodiments, the isolated strain may produce one or more additional active compounds. For example, the isolated strain may produce a biopolymer, solvent, acid, exopolysaccharide, and the like.

In some embodiments, the at least one isolated strain of bacteria comprises a strain of *Bacillus*. In other embodiments, the at least one isolated strain comprises a strain of bacteria capable of biosurfactant production and that is non-pathogenic. Non-limiting examples of suitable strains are listed in Satpute et al. "Methods for investigating biosurfactants and bioemulsifers: a review" *Critical Reviews in Biotechnology*, 2010, 1-18. For example, the at least one isolated strain of *Bacillus* may be *Bacillus amyloliquefaciens, Bacillus licheniformis, Bacillus pumilus, Bacillus subtilis*, or combinations thereof, in particular *Bacillus licheniformis*.

In some embodiments, the pH of the composition may be selected or adjusted to provide a suitable pH for the isolated strain(s). In some embodiments, the composition may further comprise one or more nutrients to support growth of the bacteria such as, for example, acetate, one or more vitamins, and the like.

In some embodiments, the isolated strain is in a viable form. For example, in some embodiments, the isolated strain may be in the form of a liquid suspension. In some embodiments, the isolated strain may be incubated for a suitable period of time prior to incorporation into the composition such that at least a portion of biosurfactant(s) is/are secreted into the bacterial suspension and therefore can be incorporated into the composition. For example, the bacteria can be incubated/fermented for between about one day and about six months or longer. The isolated strain may be incubated in the presence of a nutrient source and under suitable conditions (e.g. temperature, agitation, etc.) to produce the biosurfactant(s).

In other embodiments, the isolated strain may be in a lyophilized (freeze-dried) form. In some embodiments, the freeze-dried form comprises freeze-dried spores.

In some embodiments, where the isolated strain is in the form of a liquid suspension or in a freeze-dried form, the composition may comprise approximately 40 billion CFU (colony forming units) and may be combined with at least about 1 g of lignin and up to several tons of lignin.

In other embodiments, the isolated strain may be in an inviable form. For example, the isolated strain may be in the form of heat-killed cells or a cell lysate. In these embodiments, the bacteria of the isolated strain may be incubated for a suitable period of time prior to loss of viability (e.g. heat killing or lysis) such that a sufficient quantity of biosurfactant(s) is/are secreted into the bacterial suspension for incorporation into the composition. For example, the bacteria may be incubated for at least one week prior to loss of viability.

In other embodiments, a liquid suspension of bacteria may be incubated to produce the biosurfactant(s) and a supernatant containing the biosurfactant(s) may be separated from the bacterial cells and used in the composition.

Without being limited by theory, it is believed that the combination of lignin and the biosurfactant produced by the isolated strain act to mimic the natural habitat of the biosurfactant producing strains. The lignin may function as a growth substrate that contains required nutrients (carbon and fructose) to support growth of the bacteria, with the exception of additional acetate and metallic vitamins, which may be added to the composition as needed.

In addition, a series of drop collapse tests were conducted to evaluate additional benefits of combining the lignin with a suitable biosurfactant in the diluent of the invention. In particular, the tests were carried out to determine the effectiveness of the diluents of the invention in reducing the surface tension of water and other liquids. The results indicated that a further advantage in combining the lignin and biosurfactant in the diluent of the invention is a significant reduction in surface tension at concentrations of between about 10 ppm and 300 ppm of the biosurfactant, which assists significantly in the compositions ability to cut through hydrocarbon containing materials.

In some embodiments, the diluents of the invention further comprise catholyte solutions. As used herein, "catholyte solution" is an activated solution produced in an electrochemical reaction, and is that part of the electrolyte solution adjacent the cathode of an electrochemical cell. It can be produced, for instance, from a 0.05%-1% salt brine (NaCl or KCl), and has a pH in the range 10.0 to 13.0 and an ORP/Redox value of less than about −800 mV, typically in the order of −900 to −950 mV. In the case of an NaCl starting solution, the active ingredient is highly active, and typically unstable, NaOH.

The diluents of the invention can comprise from about 1% to about 75% by volume of the catholyte solution.

In some embodiments, the diluent further comprises at least one of a carboxylic acid or a salt or ester thereof. In some embodiments, the carboxylic acid is a di-carboxylic acid or a salt or ester thereof. The carboxylic acid or salt/ester thereof, may function as a solvent, for example, by facilitating formation of a stable emulsion of the various components of the composition. In some embodiments, the composition comprises a carboxylic acid ester. In some embodiments, the carboxylic acid ester comprises a methyl ester or a butyl ester. In some embodiments, the butyl esters are produced by biochemical metathesis. In some embodiments, the butyl ester comprises n-Butyl 4-oxopentanoate. In some embodiments, the methyl ester comprises unsaturated $C_{10}$ or $C_{12}$ methyl ester. In some embodiments, the methyl ester comprises methyl 9-decenoate or methyl 9-dodecenoate. In some embodiments, the methyl ester is produced from a plant oil feedstock.

In other embodiments the di-carboxylic acid or a salt or ester thereof may comprise at least one oleic acid or a salt or ester thereof. In some embodiments, the oleic acid or a salt or ester thereof may be provided in the form of "tall oil", a viscous liquid obtained as a byproduct of the Kraft process. In some embodiments, the tall oil may be distilled to tall oil rosin or tall oil fatty acid (TOFA), which comprise a higher proportion of oleic acids than tall oil.

In some embodiments, the diluent further comprises carbon black. The carbon black may be electroconductive carbon black and the carbon black may function to increase the conductivity of the composition. In some embodiments, the carbon black may be conductive, superconductive, extra-conductive or ultraconductive carbon black. In some embodiments, the carbon black may be in the form of carbon black beads, microparticles, and/or nanoparticles. For example, the carbon black may comprise Printex™ XE2 B Beads from Orion Engineered Carbons™. In some embodiments, the composition may comprise about 0.5% to about 10% carbon black by volume. In some embodiments, addition of carbon black may increase the negative zeta potential of the composition thereby increasing its electrical stability. In other embodiments, the composition may comprise any other highly conductive microparticle and/or nanoparticle.

In some embodiments, the diluent is gasified with a gas. As used herein, "gasified" refers to introduction of a gas into the composition such that bubbles of the gas are suspended therein. The term "aerated" refers to gasifying with air or oxygen. The gas may be selected based on the aerobic or anaerobic nature of the isolated strain(s) incorporated into the composition. In some embodiments, the gas at least partially comprises oxygen. For example, the gas may be air or relatively pure oxygen. In some embodiments, the gas may at least partially comprise carbon dioxide and/or nitrogen. Gasification may function to provide oxygen and/or other suitable gasses directly or in close proximity to the bacterial cells of the isolated strain. Gasification may promote proliferation of the bacterial cells and allow the composition to be used or stored for an extended period of time. In some embodiments, the aerated composition may have a half-life of about 20 to 30 days.

In some embodiments, the composition is gasified with nanobubbles and/or microbubbles of the gas. As used herein, "nanobubble" refers to bubbles in the nanometer range and "microbubble" refers to bubbles in the micrometer range. The nanobubbles and/or microbubbles may be introduced into the composition by any suitable means including, for example, a micro- or nanobubble nozzle or a venturi tube.

It has surprisingly been found that using a stabilized or upgraded as opposed to an otherwise unstable catholyte solution enhances the action of the diluents of the invention. Accordingly, in some embodiments, the catholyte solution is pre-treated in a system that is designed to introduce nitrogen gas into the catholyte solution, in particular in the form of nano- and/or micro-bubbles, for incorporation into a diluent of the invention.

Accordingly, in some embodiments, the catholyte solution is upgraded prior to blending with the other components of the diluent.

In some embodiments, the diluent may comprise any other suitable components. For example, in some embodiments, the diluent may further comprise at least one nutrient source for the live bacteria of the isolated strain.

Therefore, in some embodiments, a relatively non-toxic, inert, and sustainable diluent is provided for diluting bitumen to appropriate levels. The diluent may also be relatively low cost as lignin is a waste product of pulp and paper operations that is typically discarded.

In some embodiments, the reservoir is an oil sands reservoir. Oil sands, also known as tar sands and bituminous sands, are naturally occurring deposits of viscous oil in loose sands or partially consolidated sandstone. As used herein, "viscous oil" refers to hydrocarbon material having high viscosity and high specific gravity. In some embodiments, viscous oil comprises heavy oil and/or bitumen. Heavy oil may be defined as a hydrocarbon material having a viscosity greater than 100 centipoise (0.1 Pa/s) under reservoir conditions and an API gravity of 20° API or lower. Bitumen may be defined as a hydrocarbon material having a viscosity greater than 10,000 centipoise (10 Pa/s) under reservoir conditions and an API gravity of 100 API or lower.

In some embodiments, the heavy oil containing material comprising oil sands ore extracted from an oil sands reservoir. As used herein, "oil sands ore" refers to a mixture of viscous oil and sand, clay, and/or water extracted from the oil sands reservoir. In some embodiments, the oil sands are may be extracted by a surface mining process. The term "surface mining" in this context refers to extraction of oil sands ore from an open pit or burrow. Surface mining is used for viscous oil deposits located relatively close to the surface. For example, surface mining operations at the Athabasca oil sands in Alberta, Canada typically involve excavating oil sands ore from a mine pit using hydraulic or electric shovels. The ore is then further processed, including, for example, crushing the ore into smaller particles and mixing the ore with the diluent of the invention to form a slurry that can be transported by pipeline or rail.

FIG. 1 is a flowchart of an example method 100 for treating a heavy oil containing material, according to some embodiments.

At block 102, a diluent is provided comprising lignin and at least one isolated strain of bacteria capable of biosurfactant production. The diluent may be any embodiment thereof described above. The term "provided" in this context may refer to making, receiving, buying, or otherwise obtaining the diluent.

At block 104, the bitumen is contacted with the diluent. The term "contact" in this context typically comprises adding the diluent to the bitumen until the latter is sufficiently diluted to meet the required specifications for transport, be it by pipeline or rail.

In some embodiments, the bitumen may be contacted with the diluent at relatively low temperatures such as below 100° C., below 50° C., below 25° C., or lower. In some embodiments, the temperature may be the ambient temperature i.e. the temperature in the surrounding environment without the addition of heat. In other embodiments, the temperature may be raised, for example, further to lower the viscosity of the bitumen. The temperature can be raised by electric heating, electromagnetic heating, microwave heating or any other suitable heating means.

Various modifications besides those already described are possible without departing from the concepts disclosed herein. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Although particular embodiments have been shown and described, it will be appreciated by those skilled in the art that various changes and modifications might be made without departing from the scope of the disclosure. The terms and expressions used in the preceding specification have been used herein as terms of description and not of limitation, and there is no intention in the use of such terms and expressions of excluding equivalents of the features shown and described or portions thereof.

The invention claimed is:

1. A method of diluting a heavy oil containing material, the method comprising:

providing a diluent comprising i) lignin and ii) at least one isolated strain of bacteria capable of producing at least one biosurfactant and/or at least one biosurfactant produced from the at least one bacteria, the diluent comprising from about 1 wt. % to about 65 wt. % of concentrated lignin; and contacting the heavy oil containing material with the diluent in an amount sufficient to form a diluted material capable of being transported by pipeline or rail, wherein the amount of the diluent in the diluted material is from about 5 wt. % to about 60 wt. %.

2. The method of claim 1, wherein the amount of the diluent in the diluted material is from about 10 wt. % to about 35 wt. %.

3. The method of claim 1, wherein the heavy oil containing material is bitumen.

4. The method of claim 1, wherein the lignin comprises at least one of lignin nanoparticles and lignin microparticles.

5. The method of claim 1, wherein the lignin comprises lignin particles, wherein at least 20% of the lignin particles are lignin nanoparticles.

6. A composition comprising a heavy oil containing material and from about 5 wt. % to about 60 wt. % of a diluent, wherein the diluent comprises: i) from about 1 wt. % to about 65 wt. % of concentrated lignin and ii) at least one isolated strain of bacteria capable of producing at least one biosurfactant and/or at least one biosurfactant produced from the at least one isolated strain of bacteria.

7. The composition of claim 6, wherein the lignin is technical lignin.

8. The composition of claim 7, wherein the technical lignin comprises at least one of Kraft lignin, lignosulfonates, soda lignin, organosolv lignins, steam-explosion lignin, enzymatic hydrolysis lignin, or unhydrolyzed Kraft black liquor lignin.

9. The composition of claim 6, wherein the lignin is in an aqueous suspension.

10. The composition of claim 6, wherein the lignin comprises at least one of lignin nanoparticles and lignin microparticles.

11. The composition of claim 6, wherein the lignin comprises lignin particles, wherein at least 20% of the lignin particles are lignin nanoparticles.

12. The composition of claim 6, wherein the at least one isolated strain of bacteria is selected from the group consisting of *Bacillus amyloliquefaciens, Bacillus licheniformis, Bacillus pumilus, Bacillus subtilis*, and combinations thereof.

13. The composition of claim 6, wherein the at least one isolated strain of bacteria is in the form of a liquid suspension or freeze-dried spores.

14. The composition of claim 6, further comprising a catholyte solution.

15. The composition of claim 14, wherein the catholyte solution is a stabilized or enhanced catholyte solution.

16. The composition of claim 6, further comprising at least one of a carboxylic acid or a salt or ester thereof.

17. The composition of claim 16, wherein the carboxylic acid ester comprises a methyl ester or a butyl ester or the carboxylic acid or salt or ester thereof comprises a dicarboxylic acid or a salt or ester thereof.

18. The composition of claim 6, further comprising carbon black.

19. The composition of claim 6, wherein the diluent is gasified with at least one of nanobubbles and microbubbles.

20. The composition of claim 6, wherein the heavy oil containing material is bitumen.

* * * * *